(12) United States Patent
Akopian et al.

(10) Patent No.: US 9,741,256 B2
(45) Date of Patent: Aug. 22, 2017

(54) REMOTE LABORATORY GATEWAY

(75) Inventors: David Akopian, San Antonio, TX (US);
Arsen Melkonyan, San Antonio, TX (US); Murillo Pontual, San Antonio, TX (US); Grant Huang, San Antonio, TX (US); Andreas Robert Gampe, San Antonio, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 1366 days.

(21) Appl. No.: 13/291,065

(22) Filed: Nov. 7, 2011

(65) Prior Publication Data

US 2013/0117019 A1 May 9, 2013

(51) Int. Cl.
*G09B 5/00* (2006.01)
*G06Q 50/00* (2012.01)

(52) U.S. Cl.
CPC ............... *G09B 5/00* (2013.01); *G06Q 50/00* (2013.01); *G09G 2358/00* (2013.01); *G09G 2370/02* (2013.01)

(58) Field of Classification Search
CPC ........ H04L 65/403; G09B 5/00; G06Q 50/00; G09G 2358/00; G09G 2370/02
See application file for complete search history.

(56) References Cited

U.S. PATENT DOCUMENTS

| | | | | |
|---|---|---|---|---|
| 5,002,491 A | * | 3/1991 | Abrahamson | G09B 7/04 434/322 |
| 5,946,471 A | * | 8/1999 | Voorhees | G01R 19/2516 703/23 |
| 6,261,103 B1 | * | 7/2001 | Stephens et al. | 434/276 |
| 6,813,473 B1 | * | 11/2004 | Bruker | 434/350 |
| 8,041,437 B2 | * | 10/2011 | Stellari et al. | 700/65 |
| 8,435,038 B2 | * | 5/2013 | Wilson et al. | 434/219 |
| 2002/0147799 A1 | * | 10/2002 | Alhalabi et al. | 709/220 |
| 2003/0207243 A1 | * | 11/2003 | Shen et al. | 434/322 |
| 2004/0255269 A1 | * | 12/2004 | Santori et al. | 717/109 |
| 2006/0059400 A1 | * | 3/2006 | Clark | H04L 1/1838 714/752 |
| 2009/0106424 A1 | * | 4/2009 | Safari et al. | 709/226 |
| 2009/0197234 A1 | * | 8/2009 | Creamer et al. | 434/350 |

(Continued)

FOREIGN PATENT DOCUMENTS

WO    WO 2004059421 A2 *   7/2004

OTHER PUBLICATIONS

Gergic, Bojan et al. "Using the Internet and Virtual Instrumentation to enhance the learning of Electrical Measurements." Jan. 2004. pp. 1-7.*

*Primary Examiner* — June Sison
*Assistant Examiner* — Steven Nguyen

(57) ABSTRACT

A remote laboratory gateway enables a plurality of students to access and control a laboratory experiment remotely. Access is provided by an experimentation gateway, which is configured to provide secure access to the experiment via a network-centric, web-enabled interface graphical user interface. Experimental hardware is directly controlled by an experiment controller, which is communicatively coupled to the experimentation gateway and which may be a software application, a standalone computing device, or a virtual machine hosted on the experimentation gateway. The remote laboratory of the present specification may be configured for a software-as-a-service business model.

27 Claims, 11 Drawing Sheets

(56) References Cited

U.S. PATENT DOCUMENTS

| | | | |
|---|---|---|---|
| 2011/0022694 A1* | 1/2011 | Dalal et al. | 709/222 |
| 2011/0192905 A1* | 8/2011 | Powilleit | G06F 1/163 235/462.42 |
| 2012/0026327 A1* | 2/2012 | Jackson | 348/143 |
| 2012/0036231 A1* | 2/2012 | Thakur et al. | 709/220 |
| 2012/0288846 A1* | 11/2012 | Hull | 434/365 |
| 2013/0212149 A1* | 8/2013 | Frenz | 709/201 |
| 2013/0285909 A1* | 10/2013 | Patel et al. | 345/158 |
| 2014/0341109 A1* | 11/2014 | Cartmell | H04L 45/308 370/328 |
| 2015/0095717 A1* | 4/2015 | Frenz et al. | 714/46 |

* cited by examiner

REMOTE LABORATORY GATEWAY

BACKGROUND OF THE INVENTION

This specification relates to the field of educational technology, and more particularly to a remote laboratory architecture and gateway.

Colleges and universities use engineering laboratories to reinforce learning, giving students the opportunity to turn classroom theory into hands-on experience. In labs, students are able to observe phenomena they learn about in class, and explore how varying inputs affect experimental results. Because laboratory equipment is expensive, schools may be limited in the number of students that can be accommodated, or may require student to work in larger groups to share lab equipment. Laboratory equipment may also sit idle when it is not convenient to have facilities open for students to access.

It is known in the prior art to increase students' access to laboratory facilities by offering remote laboratories, which may be operable for example over the internet. Remote laboratories can be made available 24-hours a day, and a plurality of schools can share equipment. This can allow smaller local or private institutions to provide access to equipment available to larger and better-funded institutions. In an exemplary prior art remote laboratory architecture, students remotely access a personal computer (PC) communicatively coupled to a network such as the internet. The PC is also communicatively coupled to and configured to control experimental hardware. Students may log on to the PC, control the experiment, and log results. In some cases, features that cannot easily be controlled remotely (such as circuit layouts) may be emulated by software, including a graphical user interface (GUI).

SUMMARY OF THE INVENTION

Figure 1:
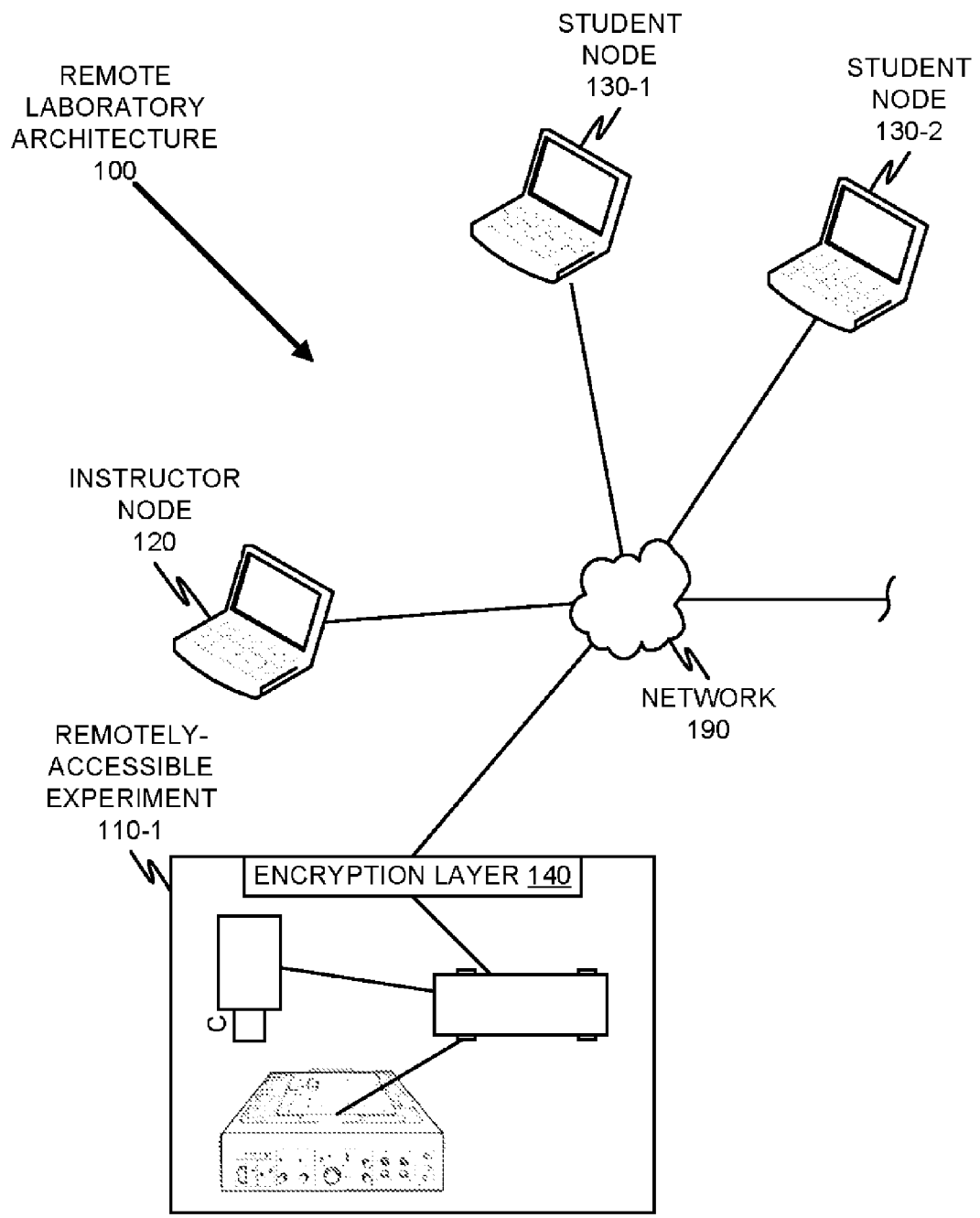
FIGS. 1-1A are a system-level block diagram of a remote laboratory architecture.

In one aspect, a remote laboratory gateway enables a plurality of students to access and control a laboratory experiment remotely. Access is provided by an experimentation gateway, which is configured to provide secure access to the experiment via a network-centric, web-enabled interface graphical user interface. Experimental hardware is directly controlled by an experiment controller, which is communicatively coupled to the experimentation gateway and which may be a software application, a stand-alone computing device, or a virtual machine hosted on the experimentation gateway. The remote laboratory of the present specification may be configured for a software-as-a-service business model.

DETAILED DESCRIPTION OF THE EMBODIMENTS

This specification describes a remote laboratory gateway and architecture for enabling a plurality of students to access a remotely-accessible experiment. Some remote laboratories, including some remote laboratories known in the prior art, are based on a web application configured to grant a user access to a remote experiment. Unlike pure software simulators, a remote laboratory includes physical hardware components that can be manipulated in real time via the web-based graphical user interface (GUI). Additional software may be used to visualize results, measure and record data collected from the experiment, and provide feedback. In some cases, physical hardware may be mixed with software emulation. For example, a GUI may provide virtual instrumentation features, or certain circuits may be simulated in a software environment such as SPICE, and the outputs of simulations may be used to drive real input voltages on experimental hardware.

An exemplary embodiment of the remote laboratory gateway and architecture of the present specification incorporates a number of useful features, including those described in Table 1.

TABLE 1

Summary of Remote Laboratory Features

Remote laboratories can be provided as a system-as-a-service (SaaS), so that third-party lab providers and their clients can connect to the gateway.
Experiment Controllers do not require static IP address.
Experiment controllers and experimentation gateways are physically separated.
Internet-based experiments can be at physically different locations.
Network-centric authentication and GUI.
Group policy with a queue and passing function for control of an experiment.
Remote desktop transmission quality control, including for example resolution control, frame rate control, and compression.
Real-Time video display.
Remotely-controllable motorized camera.
Chat rooms and discussion boards.
User polling and quizzing features.

The remote laboratory gateway and architecture of the present specification may be implemented as a SaaS solution to enable broader deployment of remote laboratories, reducing the need for local servers and other infrastructure. Enhancements such as video, chat, and group features may be integrated to enrich the perception of hands-on interaction.

1. Baseline Architectures

The remote laboratory gateway implements a number of features included in certain baseline architectures, some of which features are known in the prior art. Those architectures and features include the following.

1.1. Remote Desktop Architecture

Figure 8:
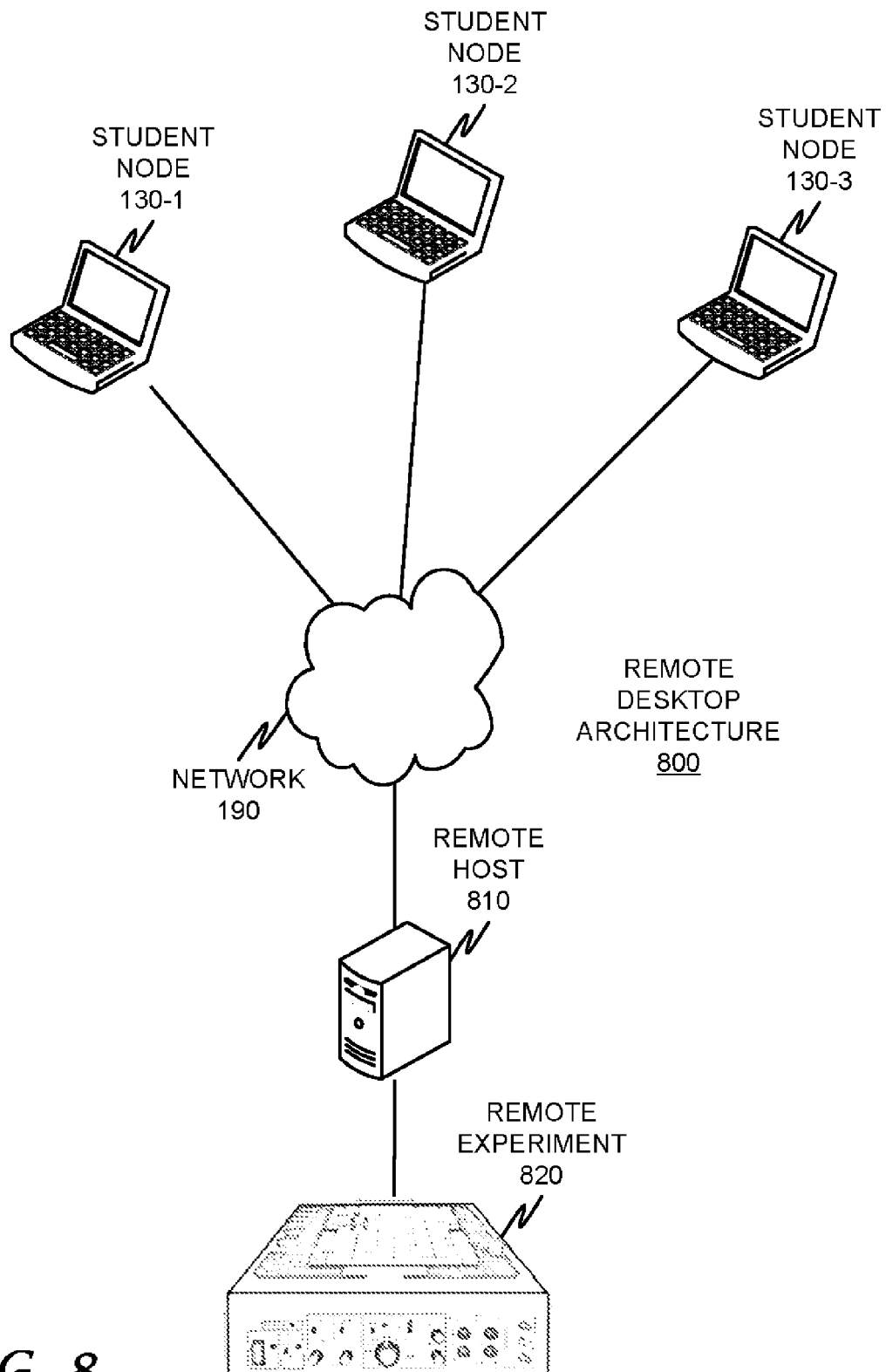
FIG. 8 is a block diagram of an exemplary embodiment of a remote desktop architecture.

A remote desktop architecture 800 is shown in FIG. 8. This architecture employs conventional remote host 810 to access a remote experiment 820. Remote users operating student nodes 130 are able to directly access remote host 810 over network 190. Remote host 810 is configured to control remote experiment 820, enabling students to conduct experiments. To enable a remote user to access remote host 810, remote experimentation software known in the art may be installed. The user accesses remote host 810 using specific information, such as an IP address assigned to remote host 810. In this exemplary architecture, student node 130-1 requires exclusive control over remote host 810 to operate remote experiment 820. Additional student nodes 130-1 and 130-2 may try to connect to remote host 810 while student node 130-1 is operating remote experiment 820. In that case, the additional student nodes 130 may be queued in a first-in-first-out sequence.

1.2. Server-Centric Architecture

Figure 9:
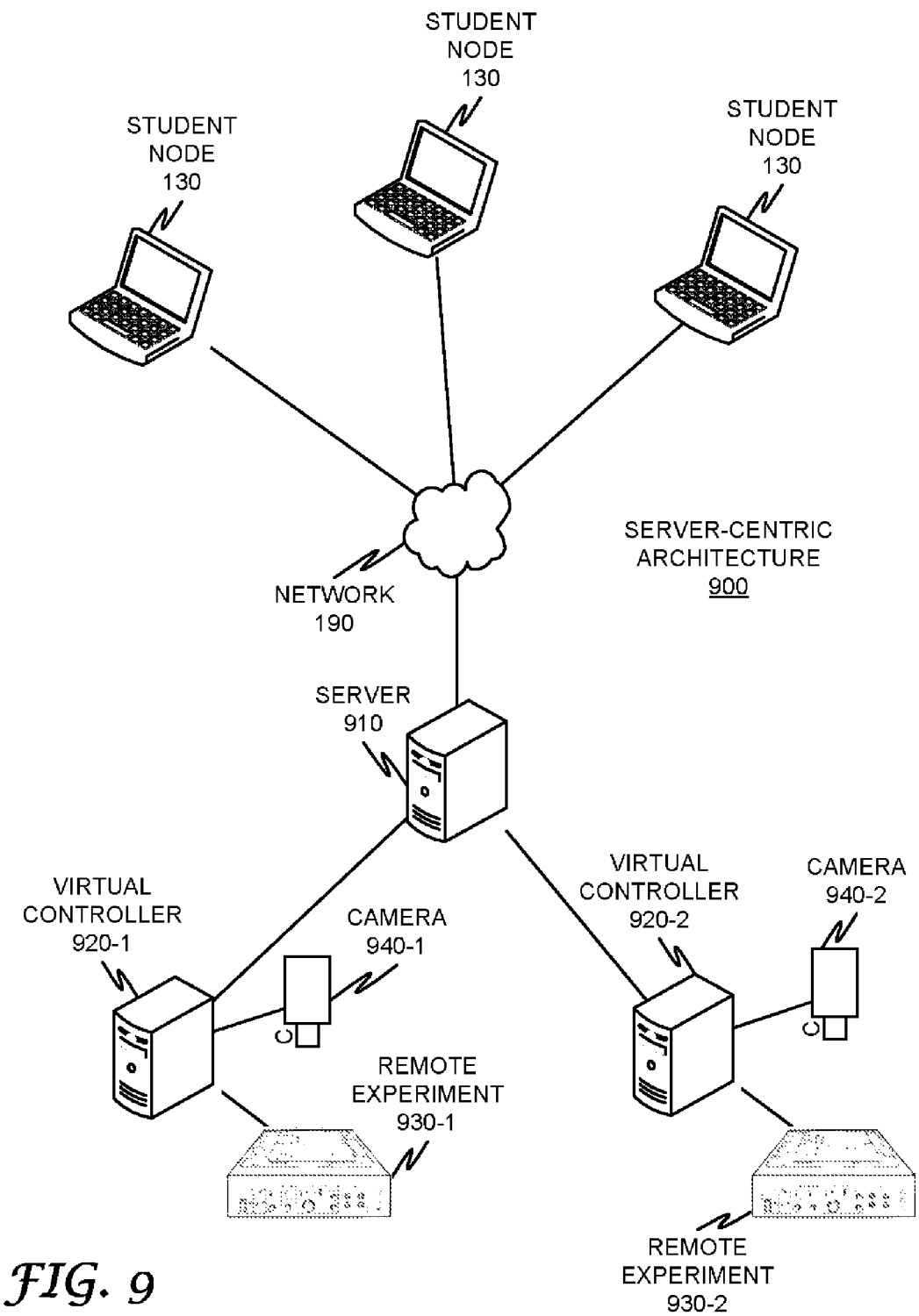
FIG. 9 is a block diagram of an exemplary embodiment of a server-centric architecture.

A server-centric architecture 900 is shown in FIG. 9, which in some embodiments is more sophisticated and capable than the remote desktop architecture 800 of FIG. 8. The server-centric architecture 900 may be configured to concurrently provide multiple experiments to multiple users. In this configuration, a server 910 is communicatively coupled to a plurality of virtual controllers 920, each of which is configured to control a remote experiment 930. A camera 940 may be provided with each remote experiment 930 to provide a real-time visual link to remote experiment 930. Server 910 is configured to connect to a plurality of student nodes 130 via network 190.

In order to provide access to multiple experiments, server-centric architecture 900 operates on a client-server model. Server 910 is configured to provide software support for a plurality of experiments, each of which may be directly connected to server 910. Virtual controllers 920 may be software virtual machines running on server 910, and each may provide an operating environment for a discrete remote experiment 930.

One exemplary server-centric architecture known in the art is UTS, described in M. D. Lowe, et. al, "Experiences With a Hybrid Architecture for Remote Laboratories," *Proc. 38th ASEE/IEEE Frontiers in Education Conf.*, 2008, which is incorporated by reference. UTS employs the Apache web server to manage access by several users. Several virtual machines are installed on 910 and connected to remote experiments 930. Users can access all experiments through an ordinary web browser from any remote PC, installing little or no special proprietary software. UTS also provides real time audio/visual monitoring tools to provide a richer experimental experience.

The exemplary server-centric architecture 900 requires student node 130 to include a web browser and remote desktop client.

1.3. Server-as-a-Gateway Architecture

Figure 10:
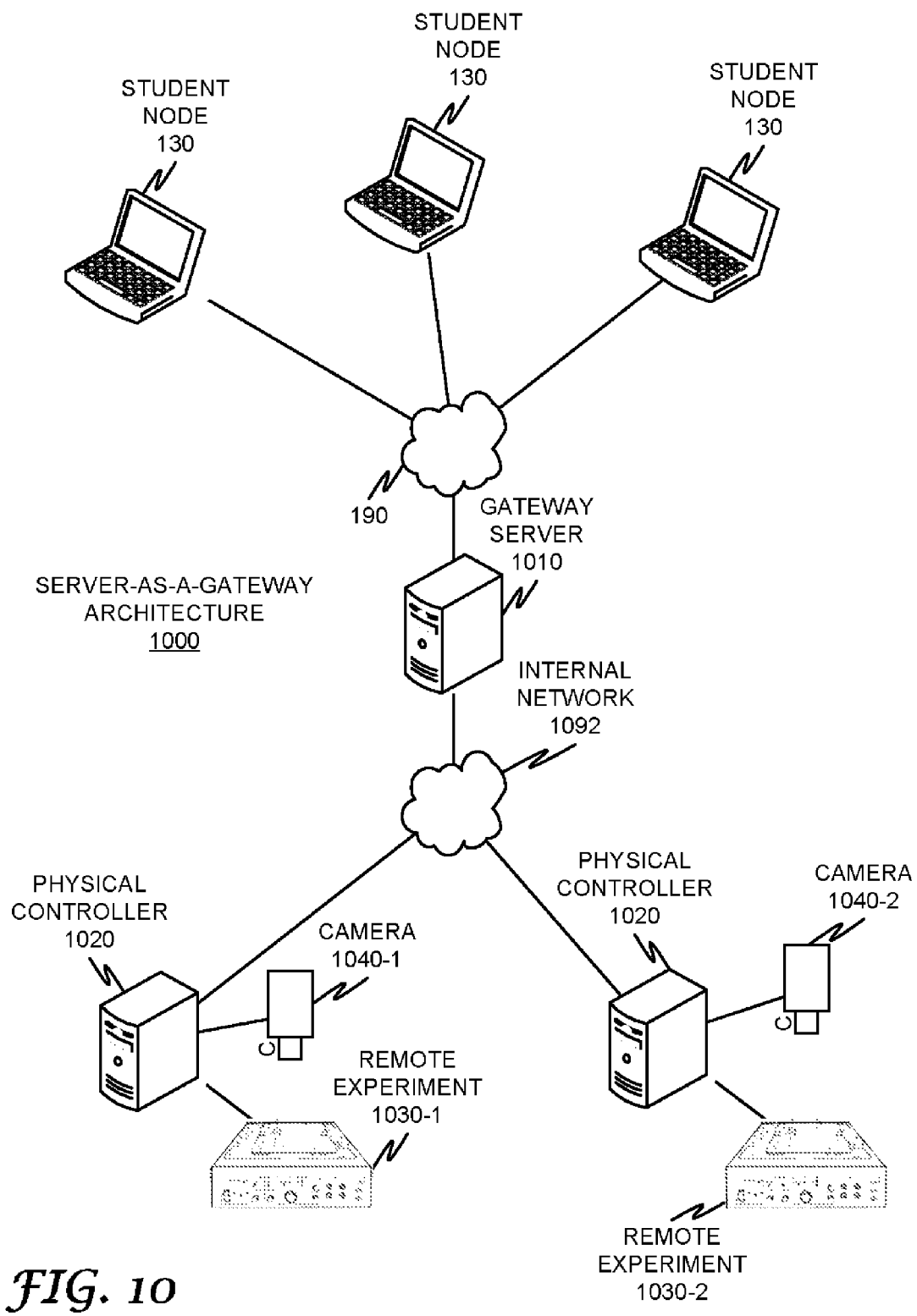
FIG. 10 is a block diagram of an exemplary embodiment of a server-as-a-gateway architecture.

A server-as-a-gateway architecture 1000 is shown in FIG. 10. In this embodiment, server 1010 acts as a gateway, which directs the user to the requested remote experiment 1030 by connecting to the corresponding physical controller 1020 through sophisticated user management applications. Each remote experiment 1030 is connected to and controlled by a physical controller 1020, which is connected to server 1010 either physically or through internal network 1092. Each physical controller 1020 includes all necessary experiment control software. For example, National Instruments' LabVIEW is a popular solution for controlling external hardware. In some embodiments, a camera 1040, such as a web cam, may be provided to supply a real-time visual feed of remote experiment 1030. One exemplary embodiment of a server-as-a-gateway architecture is ReLOAD, described in B. Hanson, et. al, "ReLOAD: Real Laboratories Operated at a Distance," *IEEE Transactions on Education*, vol. 42, No. 4, pp. 331-341, 2009, which is incorporated herein by reference.

1.4. Proprietary Architectures

A number of proprietary client-server architectures are also known in the art. In a proprietary architecture, users are required to install proprietary software to communicate with a server and control a remote experiment. Servers can be implemented either as a server-centric or server-as-a-gateway architectures. One example of a proprietary client-server architecture known in the art is the AIM-Lab, described at H. Shen, et. al, "Conducting Lab oratory Experiments Over the Internet," *IEEE Transactions on Education*, Vol. 45, No. 2, pp. 145-151, 1999, which is incorporated herein by reference; and Emona net*TIMS. In AIM-Lab the user (Client) runs a Java based application to connect to the server and then to experimentation hardware and starts to play an intermittent role between the hardware and the user. In the Emona net*TIMS system both the Client and the Server are Java based applications, and Server-Centric architecture is used for experiments' control. National Instruments also provides LabVIEW tools called "Remote Panels" to set up remote labs.

1.5. Multiplexing Users to Share Experiments

In a method known in the art, a plurality of users share experimentation hardware with multiplexing. In this approach fast multiplexing between users leaves an impression of continuous control of the experiment for individual users. In reality the control multiplexes from one user to another, the experiment is re-initiated for each user, and the whole multi-user cycle is short so that users do not perceive the multiplexing. But this approach is limited to experiments that have fast input-to-output responses.

2. Remote Experimentation Gateway and Architecture

A remote laboratory architecture will now be disclosed with more particular reference to FIGS. 1-7.

Figure 1A:
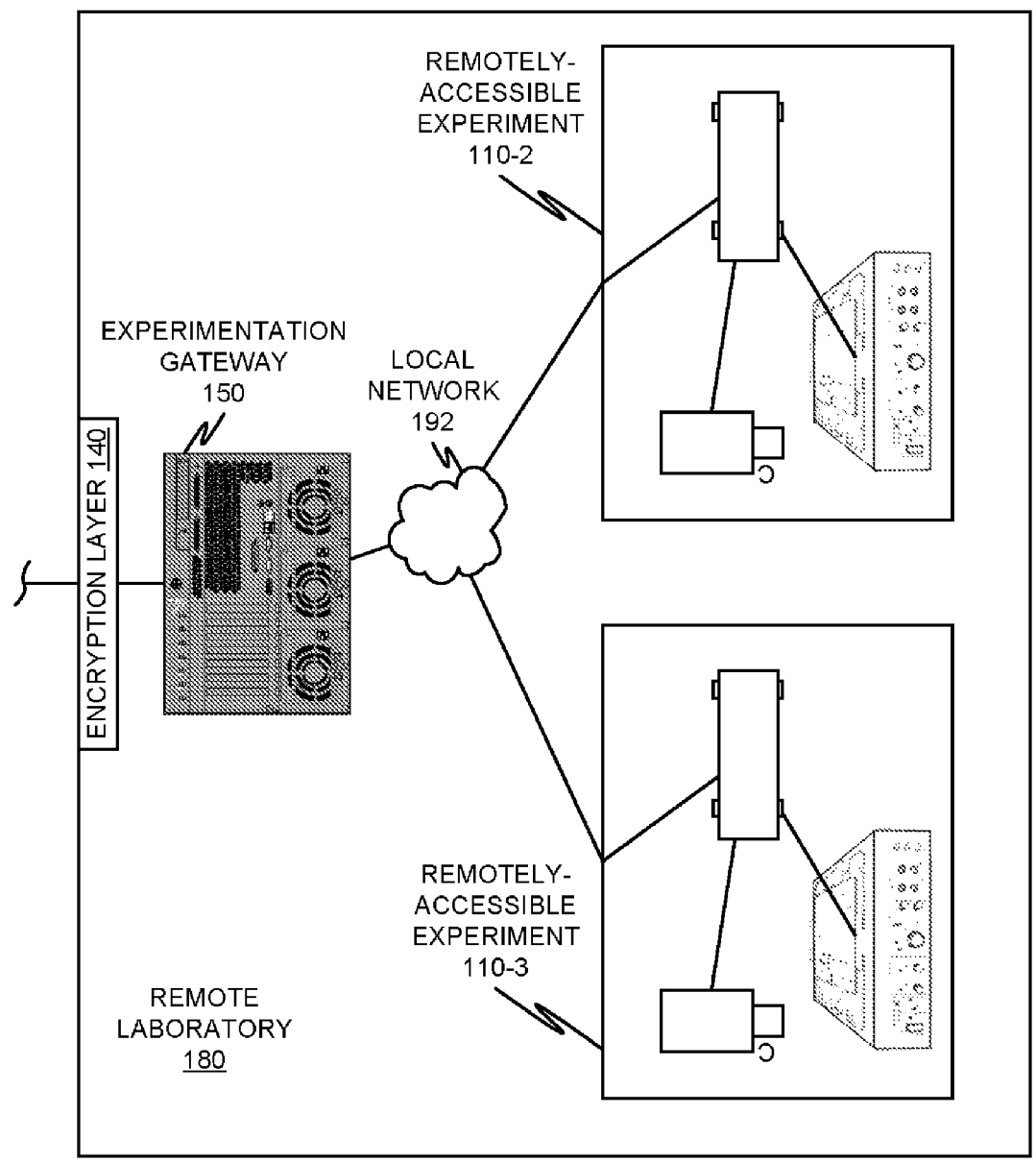

FIGS. 1-1A are a system-level block diagram of a remote laboratory architecture 100. Remote laboratory architecture 100 comprises a plurality of remotely accessible experiments 110 communicatively coupled to a network 190. Remotely accessible experiment 110-1 is a standalone experiment communicatively coupled to network 190, which may be for example the Internet or any other similar network for interconnecting electronic devices. Remotely accessible experiment 110-1 includes a stand-alone encryption layer 140, which may provide communication over the secure HTTPS protocol or other similar security mechanism. Those having skill in the art will recognized that encryption layer 140 may be embodied in any kind of secure communication protocol, implemented in hardware and/or software, and this specification expressly encompass any security protocol that provides secure communication between two electronic devices.

A plurality of student nodes 130 and at least one instructor node 120 are also communicatively coupled to network 190. Instructor node 120 provides an instructor or other administrative operator privileged access to remote laboratory architecture 100, including administrative features. Student nodes 130 provide general experimental access to remote laboratory architecture 100. Any of student nodes 130 and instructor nodes 120 may include a laptop computer, PC, tablet, smart phone, or other similar computing device configured to enable a user to interact with remote laboratory architecture 100. By operating student nodes 130, student may carry out experiments, gather data, and analyze results.

Network 190 also communicatively couples to a remote laboratory 180. Remote laboratory 180 may be, for example, an on-campus laboratory configured to provide a plurality of remotely accessible experiments 110. Remote laboratory 180 includes an encryption layer 140, which may be provided for example by a firewall. Remote laboratory 180 is controlled by an experimentation gateway 150. Experimentation gateway 150 communicatively couples to a local network 192. Local network 192 may be isolated by encryption layer 140 from external network 190. Local network 192 communicatively couples experimentation gateway 152 to remotely accessible experiments 110-2 and 110-3.

In some embodiments, remotely accessible experiments 110-2 and 110-3 may be driven by virtual machines physically running on experimentation gateway 150. In that case, local network 192 may be an virtual network layer running on experimental gateway 150. In other embodiments, remotely accessible experiments 110-2 and 110-3 may be controlled by external physical hardware, such as a PC or other computing device. In that case, local network 192 may be a physical internal network, such as a LAN.

Remote laboratory architecture 100 enables students operating student nodes 130 to access and control remotely accessible experiments 110 according to the methods described in this specification.

Figure 2:
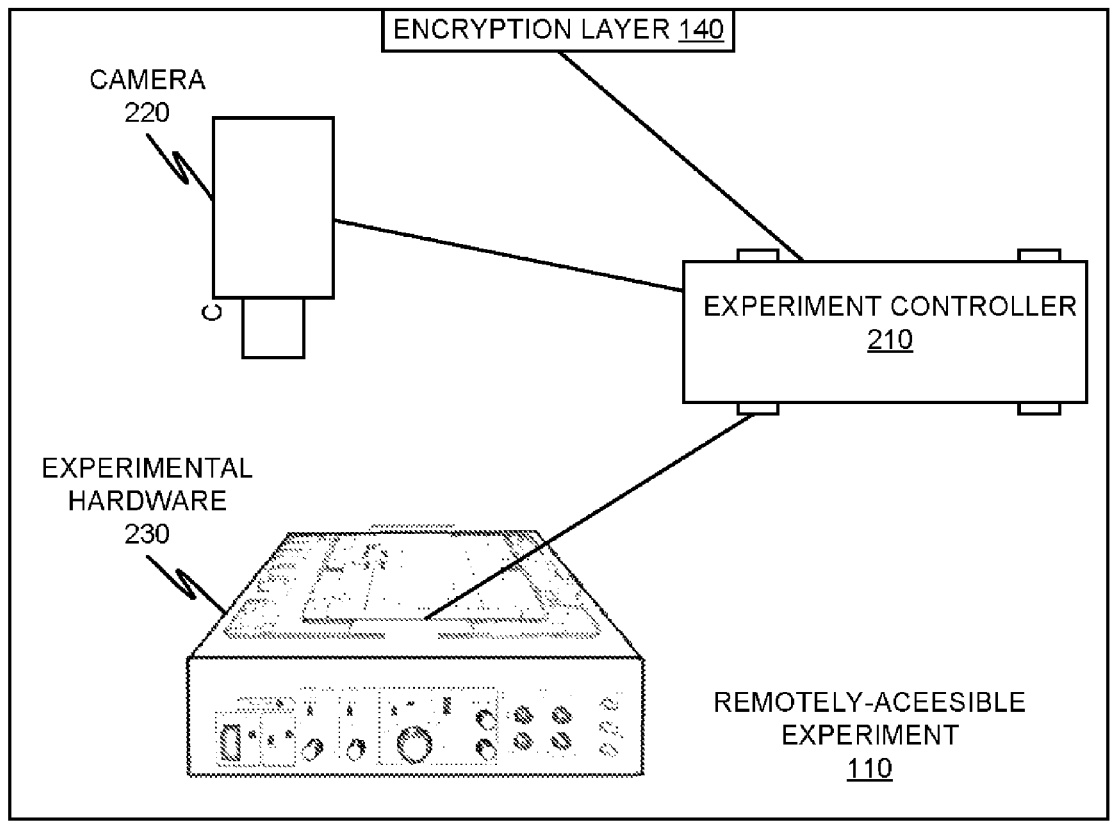
FIG. 2 is a block diagram of a remotely-accessible experiment.

FIG. 2 is a block diagram of an exemplary embodiment of a remotely accessible experiment 110. An experiment controller 210 is provided to control the experiment. Experiment controller 210 may be a stand-alone computing device, such as a PC, embedded computer, or other similar computing device, which may be co-located with experimentation gateway 150. In other embodiments, experiment controller 210 may be a virtual machine hosted on experimentation gateway 150. Experimentation controller 210 may therefore encompass either physical hardware, or hardware emulated in software. In this exemplary embodiment, remotely accessible experiment 110 includes an optional standalone encryption layer 140. This may be necessary if remotely accessible experiment 110 is controlled by a standalone experiment controller 210, as in remotely-accessible experiment 110-1 of FIG. 1. In other embodiments, security may be provided externally, for example by experimentation gateway 150. Experiment controller 210 is intended to be a genus of controller encompassing at least a stand-alone experiment controller, a co-located experiment controller, and a virtual experiment controller. Those having skill in the art will recognize that other species of experiment controllers are possible.

Experiment controller 210 communicatively couples to experimental hardware 230. Experiment controller 210 is configured to control experimental hardware 230 so that a student interacting remotely with experiment controller 210 is enabled to carry out an experiment on experimental hardware 230.

Although experimental hardware 230 is shown as a stand-alone physical device in this exemplary embodiment, in some cases experimental hardware 230 may be provided partially or entirely in software emulation. For example, experimental hardware 230 may require inputs from a circuit to be designed by students. Rather than providing physical circuit layout, experiment controller 210 may provide computer-aided design (CAD) software for defining and laying out a circuit, which may then be simulated by a program such as SPICE, or its function may be described in a MATLAB program. The outputs of the simulation may then be provided to experiential hardware 230 as an input. This specification is intended to encompass experimental hardware 230, whether it be provided completely as hardware, completely a software, or as a combination of hardware and software.

In cases where experimental hardware 230 is provided at least partially as physical hardware, a camera 220 may also be provided, so that a student interacting with remotely accessible experiment 110 can receive a real-time video feed of experimental hardware 230. This enables the student to remotely view the results of the experiment, and to assess the success of the experiment. Camera 220 is communicatively coupled to experiment controller 200 and, and is configured to provide a real-time continuous video feed to experiment controller 210, in either a compressed or uncompressed format. Camera 220 may be mounted on an electronically-controllable geared mount, so that a person viewing experimental hardware 230 is enabled to remotely pan the camera.

Figure 3:
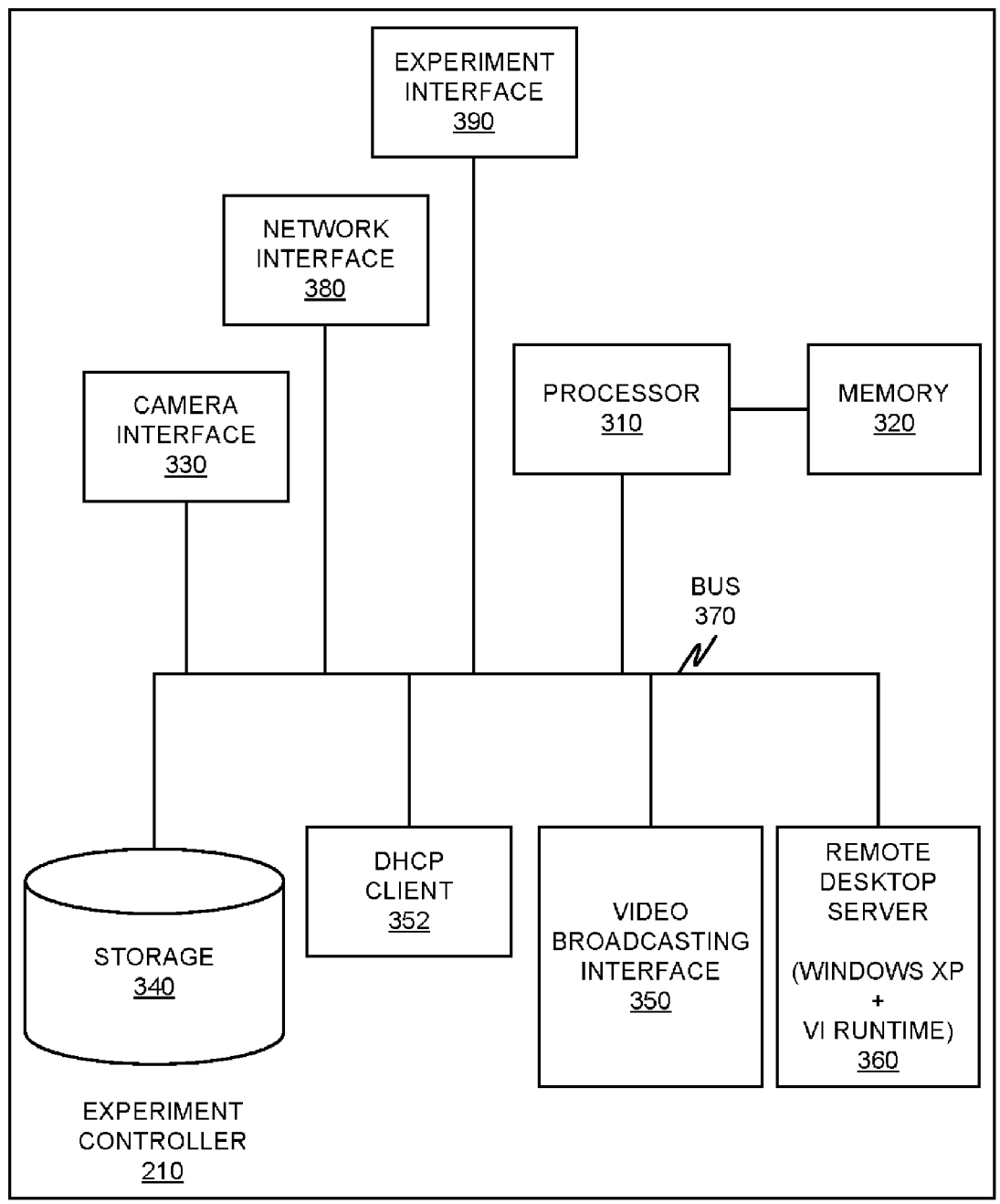
FIG. 3 is a block diagram of an experiment controller.

FIG. 3 is a block diagram of an exemplary embodiment of an experiment controller 210. Experiment controller 210 is controlled by a processor 310. Processor 310 may be a microprocessor, microcontroller, application-specific integrated circuit, field-programmable gate array, or other programmable logic device capable of executing software instructions. Processor 310 may also be a virtual processor running in software on a virtual machine.

The logical blocks disclosed in FIG. 3 provide logical functions, but the layout may be varied without departing from the scope of the present disclosure. In some cases, a function may be provided by any of hardware, software, hardware emulation in software, or any combination of the foregoing. Processor 310 may be communicatively coupled to a memory 320. Memory 320 is shown in the exemplary embodiment directly coupled to processor 310, thereby providing direct memory access. Memory 320 may be a volatile, low-latency memory technology such as a combination of random access memory and cache. Storage 340 is also communicatively coupled to processor 310 via system bus 370. In the exemplary embodiment, storage 340 is a higher latency nonvolatile memory technology, such as a hard disk drive, optical medium, static RAM, flash technology, or other similar nonvolatile technology. In some embodiments, the functions of storage 340 and memory 320 may be combined in a single physical device partitioned into logical divisions performing the various functions of memory 320 and storage 340. In the exemplary embodiment, software instructions are permanently stored on storage 340, and when needed are loaded into memory 320 where they accessible for execution by processor 310.

Processor 310 is also communicatively coupled via bus 370 to other logical blocks. A network interface 380 is configured to communicatively experiment controller 210 to network 190 or 192. This enables experiment controller 210 to communicate with external devices. A DHCP client 352 is provided so that experiment controller 210 can receive an IP address automatically via the DHCP protocol known in the art, rather than requiring a static IP address. A camera interface 330 is provided to communicatively couple experiment controller 210 to camera 220. Camera interface 330 may be configured to receive either compressed or uncompressed video, and may be provided by a number of technologies known in the art, such as ethernet, USB, FireWire, or other known interface technologies. Experiment controller 210 also includes a video broadcasting interface 350. Video broadcasting interface 350 may be provided to send real-time streaming video over network interface 380 to external devices in a compressed or uncompressed format. In some embodiments, video broadcasting interface 350 may be provided by a dedicated virtual machine running only a video broadcasting interface program.

A remote desktop server 360 is also provided. In some embodiments, remote desktop server 360 may also be a separate virtual machine configured to allow a user to remotely operate experiment controller 210 via network interface 380, thereby also providing a working environment for the user to interact with remotely accessible experiment 110. Remote desktop server 360 may operate on known technologies, such as remote framebuffer and remote desktop protocol, including enhancements such as virtual network computing (VNC). In the exemplary embodiment, remote desktop server 360 is a virtual machine running a "bare bones" Windows XP operating system and a National Instruments LabVIEW runtime environment allowing a user to access virtual instruments running on remote desktop server 360. Experiment interface 390 is configured to communicatively couple experiment controller 210 to experimental hardware 230 and to enable experiment controller 210 to control the experiment, and may employ buses or architectures known in the art, for example USB, RS-232, RS-485, VMEbus, or GPIB.

Figure 4:
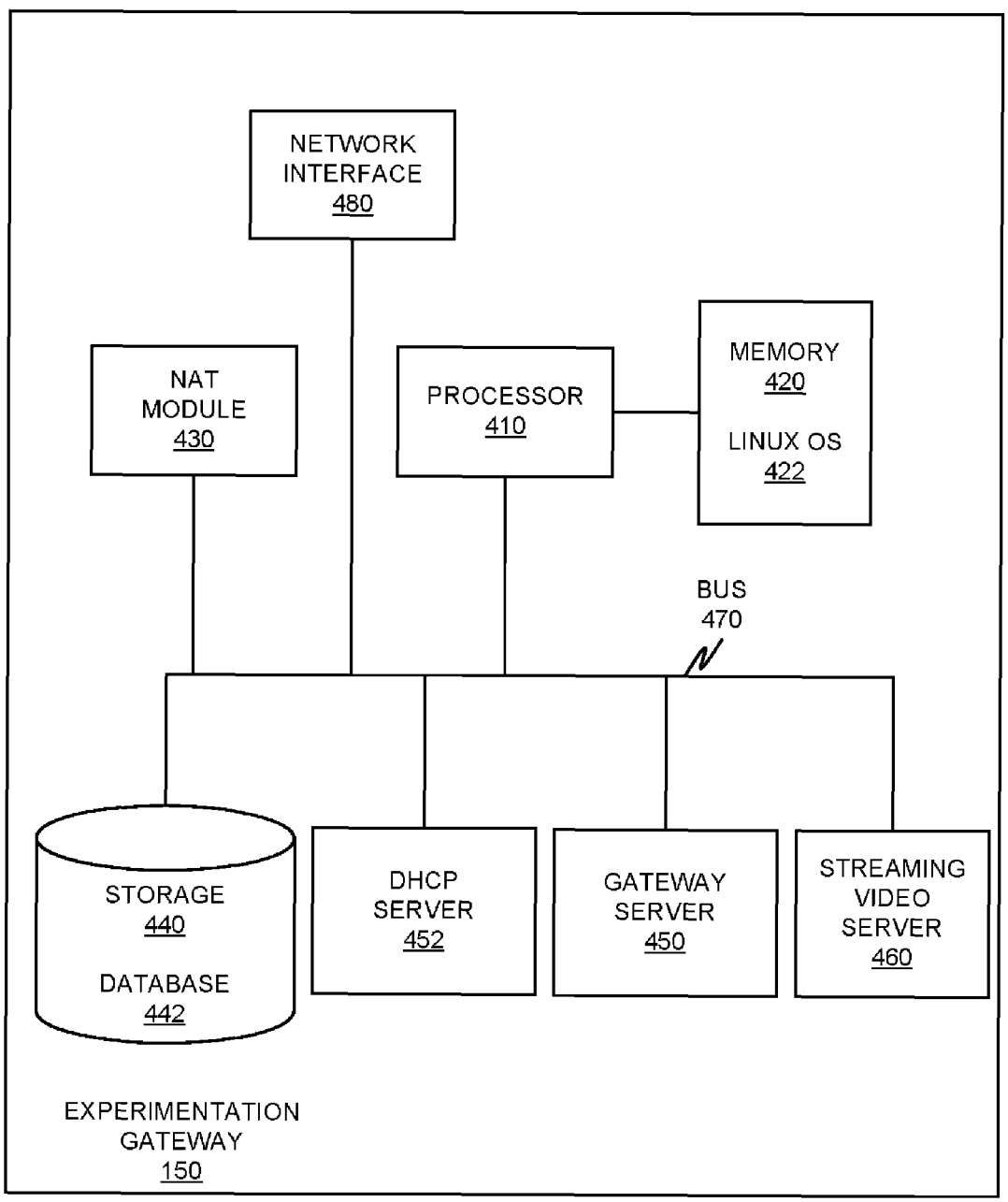
FIG. 4 is a block diagram of an experimentation gateway.

FIG. 4 is a block diagram of an exemplary embodiment of experimentation gateway 150. Experimentation gateway 150 is a computing device, and the descriptions of the various components of experiment controller 210 may also be applicable to experimentation gateway 150. Experimentation gateway 150 includes a processor 410 and a memory 420. Experimentation gateway 150 also includes a storage 440 hosting. In the exemplary embodiment, experimentation gateway 150 runs the Ubuntu Linux operating system 422 from memory 420. Storage 440 may also include a MySQL database 442. A streaming video server 460, which in the exemplary embodiment is a Red5 streaming video server, is also provided to send real-time streaming video to remote users. A network interface 480 is provided to communicatively couple experimentation gateway 150 to network 190 or 192. A DHCP server 452 is provided so that experimentation gateway 150 can provide dynamic IP addresses to a plurality of experiment controllers 210. A NAT module 430 is also provided. NAT module 430 is configured to provide network address translation, so that devices sitting behind experimentation gateway 150 in the network architecture (such as experiment controllers 210) are not visible as standalone devices to network 190. Network interface 480 also communicatively couples experimentation gateway 150 to internal network 192. NAT module 430 is configured to translate traffic on internal network 192 for use with external network 190.

A gateway server 450 provides the primary software interface for a user such as a student or instructor to interact with experimentation gateway 150 and remote laboratory architecture 100 as a whole. For example, gateway server 450 may provide a network-centric application such as a web page or mobile application that a user can log on to and access appropriate features. Gateway server 450 may provide an exemplary GUI, as more fully disclosed in FIG. 57. Although gateway server 450 is shown as an element of a single server, those having skill in the art will recognize that a gateway server can be implemented in a redundant or distributed architecture. Separate physical servers may have responsibility for providing different features of gateway server 450. Gateway server 450 may also be provided in the "cloud," so that users need not have physical access to a physical experimentation gateway 150.

Experimentation gateway 150 may be operated by the same entity providing remotely-accessible experiment 110 or by a different entity. For example, experimentation gateway 150 may be operated by a university, and remotely-accessible experiment 110 may be operated by a commercial laboratory or other facility. The entity operating remotely-accessible experiment 110 need only install appropriate software on experiment controller 210 to enable experimentation gateway 150 to provide remote access. In other embodiments, experimentation gateway 150 and experiment controller 210 may be a single physical device, with experiment controller 210 being provided by a virtual machine running on experimentation gateway 150.

Figure 5:
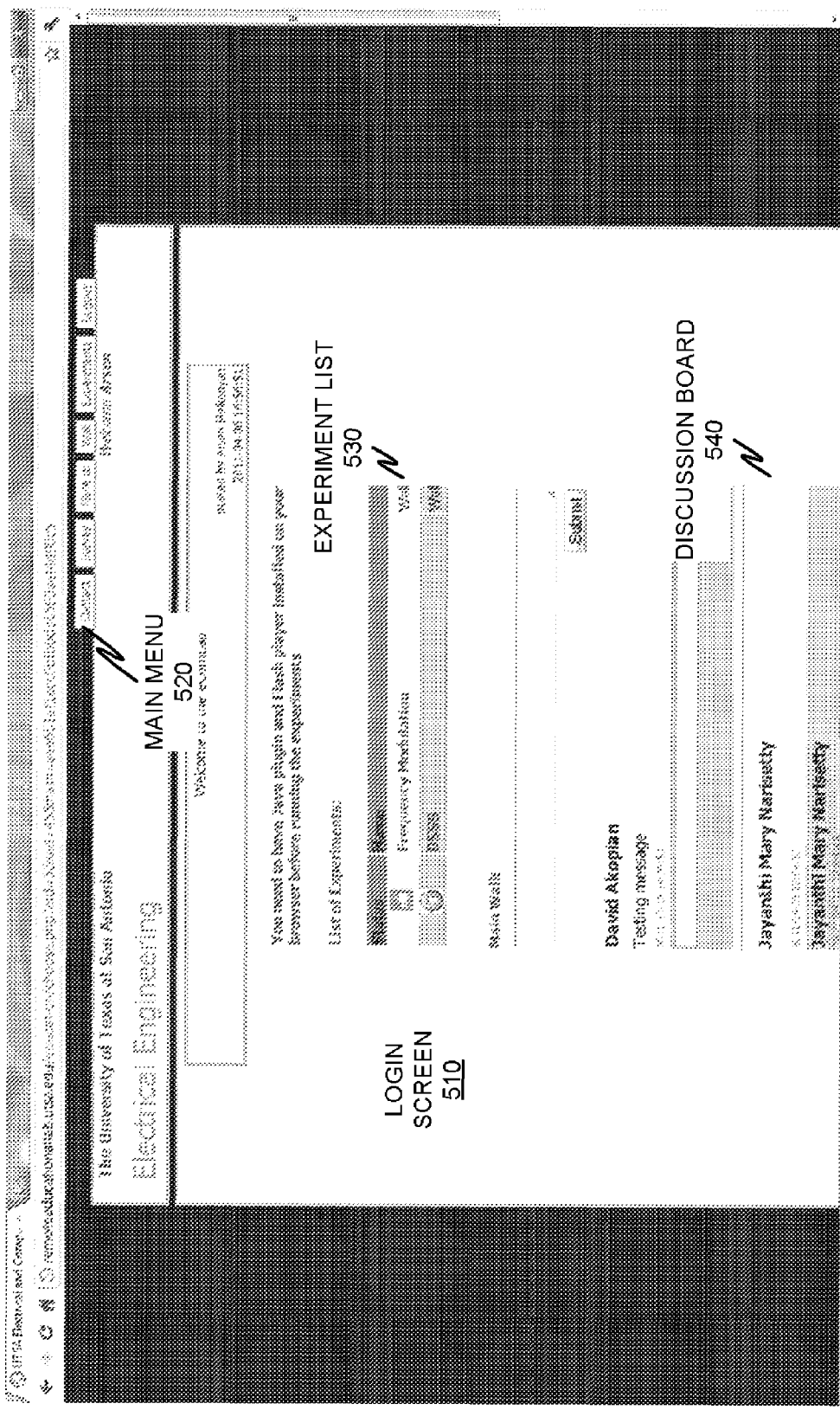
FIG. 5 is a view of an exemplary GUI for accessing a remote experiment.

In the exemplary embodiment, after logging on, a student sees the screen of FIG. 5. In the first screen students have access to the three main system areas. One of the main components in the student area is the experiment list 530. With this, students can see the available experiments. Special icons in the status column may indicate the status of the experiment, such as "free," "available," or "completed." An icon may also notifies the user that the experiment is being used and the user can join the group working on the experiment, or register in the queue. When the maximum number of "seats" for experiment is reached, access to the experiment is closed.

Another useful function is discussion board 540, where students can post their questions or comments. It is designed so that each posted comment or question can be turned to the individual discussion topic within the same discussion wall. Individual "walls" may also be provided for each experiment. The 'wall' link in the right side of each experiment corresponds to the discussion wall. The system automatically changes the discussion wall located under the experiment list once user points to the "wall" link.

The final area in the first screen of the student area is the menu bar. It allows the student to navigate within the eComLab system. The menu bar is available in all the screens of the student area. It gives an opportunity to the user to go back or forward from the main Web page to the survey or quiz area, the material area, the discussion wall, and the contacts. The menu bar includes the features disclosed in Table 2.

TABLE 2

Menu Features

| Button | Function |
|---|---|
| Survey | Complete a short survey, which helps developers to get users' feedback about the system to further improve the system. The same area is used for the short quizzes. Students can complete short pre- or post-experiment knowledge quizzes designed to test their readiness for the experiment, or to test what they learned from the experiment. |
| Materials | Experimentation support material in video or text format. Separate materials are provided for each experiment. |
| Wall | Return to the main screen, where the user can access the experiment list with the corresponding discussion walls. |
| Contacts | Send private massage to the instructor, system administrator, or other students. |
| Logout | Logout from the system. |

Figure 6:
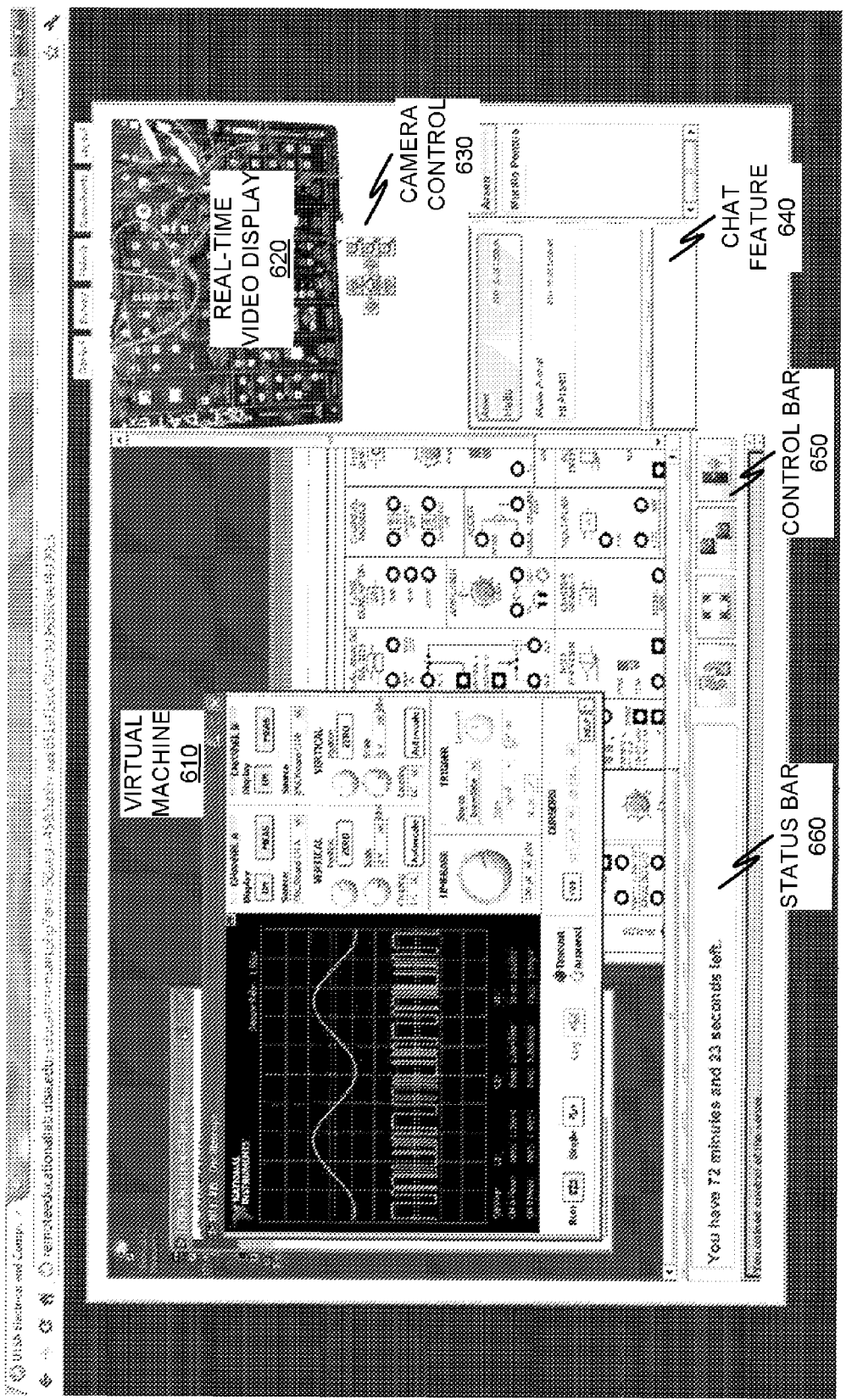
FIG. 6 is a view of an exemplary GUI for interacting with a remote experiment.

FIG. 6 is a view of an exemplary graphical user interface that a student user may see on student node 130. Once a student has gained access to the experiment, remote experiment controls at 610 are provided. This interface comprises four parts: the virtual machine 610, the real time video display 620 (including camera control 630), the chat feature 640, and the menu bar, which in the exemplary embodiment is identical to main menu 520.

Virtual machine 610 is an applet that allows students to remotely control the experiment. In the exemplary embodiment, virtual machine 610 is provided by a modified version of the open-source tightVNC client. Virtual machine 610 periodically communicates with experimentation gateway 150 to check which student node 130 has the right to control the experiment, how many users are using the experiment, and to automatically update the user queue. In the exemplary embodiment, only one student node 130 is permitted to control remotely-accessible experiment 110 at a time. If students are permitted to work in groups, then other student nodes 130 may observe experimental results. A queue of student nodes 130 is maintained, and a student node 130 may manually pass control to the next student node 130 in the queue, or experiment controller may automatically pass control to the next student node 130 after a set time to ensure that all student nodes 130 are given an opportunity to interact directly with remotely-accessible experiment 110.

A status bar 660 is also provided to show messages such as the remaining experiment time for the main user, and the user position in the queue with the remaining time until control is automatically passed. A control bar 650 next to the status bar gives several additional useful functions to the user. The control bar functions are described in Table 3.

TABLE 3

Control Buttons

| Button | Function |
| --- | --- |
| Speed Control | If a slow internet connection is causing long delays, this control can be used to slow the transmission rate from the virtual machine. |
| Refresh | If the Speed Control has been used to slow the transmission rate, the Refresh button can be used to manually refresh the display. |
| Full Screen | Switch the virtual machine display to full screen (hiding other features such as chat and camera control). |
| Pass Control | If a team is working together, the main user controls the experiment. This button allows the main user to pass control to the next user in the queue, and placing the user at the end of the queue. |

Real-time video display 620 is a flash video in the exemplary embodiment, and allows real-time observation of experimental hardware 230. Real time camera controls 630 are provided to enable a user to manually pan camera 220. Users may also be able to change the camera angle, zoom in, zoom out, or access other camera controls known in the art. This enables a user to focus on important areas of experimental hardware 230.

In the exemplary embodiment, chat feature 640 the is an applet that allows all users logged into experimentation gateway 150 to communicate with each other in real-time and offer comments and suggestions.

Figure 7:
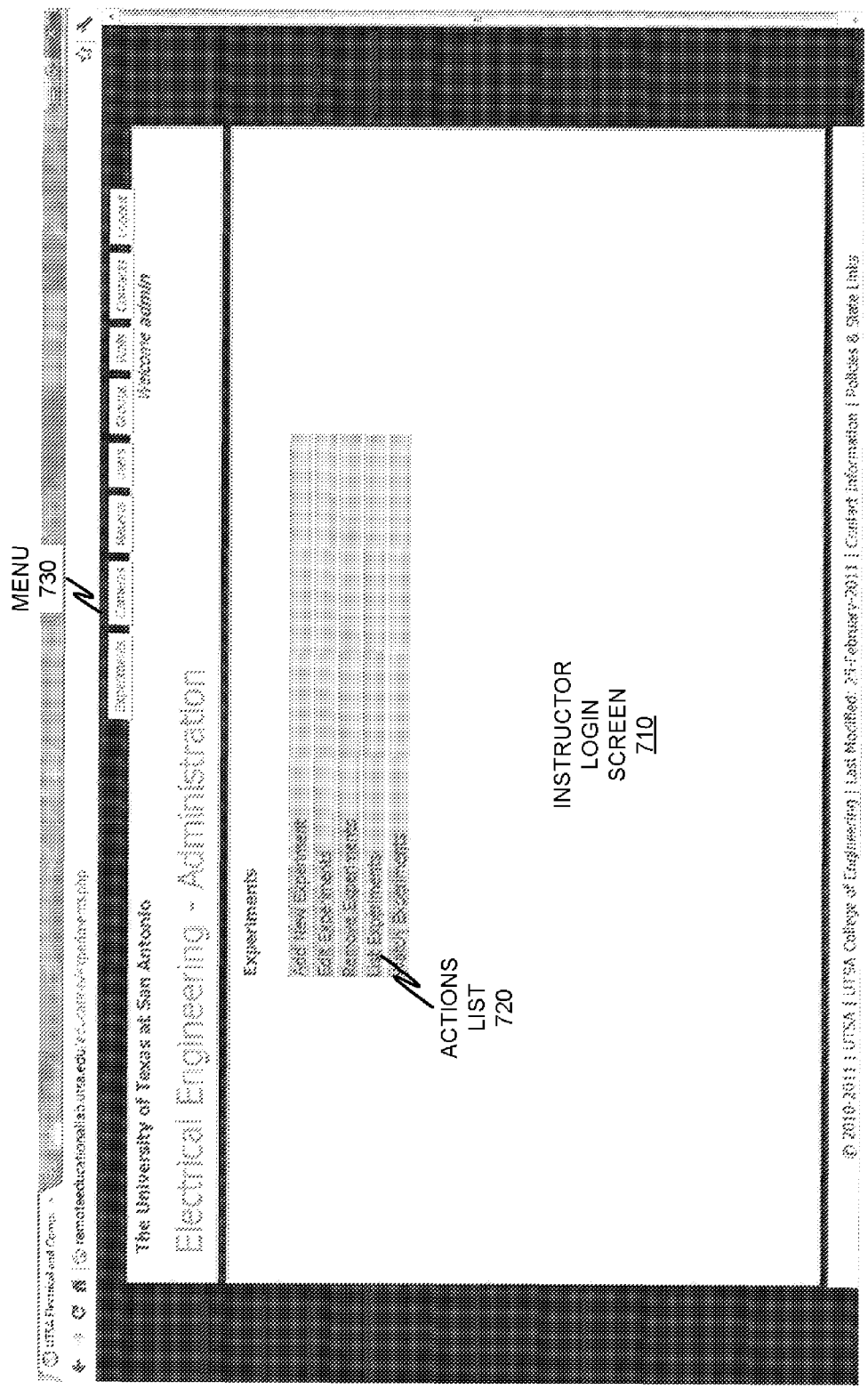
FIG. 7 is a view of an exemplary GUI for an instructor accessing a remote experimentation gateway.

FIG. 7 is a view of an instructor login screen 710. An instructor sees this screen upon logging in. In this exemplary embodiment, the instructor is also provided with a menu 730. Menu 730 comprises features similar to menu 520. The instructor may also see a list of possible actions that may be taken on action list 720. This provides the instructor options for administratively interacting with remotely accessible experiments 110 or experimentation gateway 150.

In the exemplary embodiment, instructor login screen 710 provides the features described in Table 4.

TABLE 4

Instructor Functions

| Function | Description |
| --- | --- |
| User Management | The instructor can manage the system user profile. This functionality allows creating or deleting users, edit user pass-words, and selecting a user role as a student or a new instructor. If a user is selected to be a student, the instructor has the option to attach the student to a particular experiment with the access to materials and quizzes for that experiment. |
| Experiment Management | This function enables an instructor to set up new experiments or edit existing experiments. After physically configuring remotely-accessible experiment 110, the instructor can set a number of students in the experiment group, the list of students authorized to access the experiment, and the experiment's duration. |
| Materials | In the exemplary embodiment, each experiment has separate pedagogical materials. Instructors can add or remove text material in known formats such as MS Office or PDF. Instructors may also provide audio-visual materials. A survey or quiz may also be attached to the experiment. The exemplary embodiment uses the survey API provided by "Survey Monkey." |
| Message | The instructor can receive student messages. All messages are stamped with a user name, time, and e-mail address. |
| Statistics | The instructor can automatically generate and monitor system usage statistics, such waiting times, usage times, chat, and contacts usage. The system can also generate histograms, including usage of one particular experiment, usage of the system as a whole (i.e., including all the experiments), usage patterns of individual students, and usage patterns of the chat and contacts functions. |
| Group Help | The instructor can join any experimentation group when needed and assist group members or monitor the experiment process. |

3. Exemplary Embodiments

The following paragraphs describe further describe one exemplary embodiment of a remote laboratory architecture. It is not intended for this disclosed embodiment to limit the appended claims.

3.1. Features

In one exemplary embodiment, a remote laboratory architecture is provided in connection with a wireless communication laboratory offered to electrical engineering students. This exemplary embodiment may be modeled after a combination of the server-as-gateway architecture of FIG. 10 and server-centric architecture of FIG. 9.

The system is flexible enough that the new experiments can be connected directly to the central server by creating new server-based virtual machines controlling these experiments, or the server can serve as a gateway for remote experimentation centers (an experiment and controlling PC).

In the exemplary embodiment, gateway server 450 is provided by a specially-configured Apache web server. Gateway server 450 is configured to provide a number of useful features.

3.1.1. Access

Students and instructors are able to access a network-centric application via a conventional web browser, or via a dedicated network-enabled application. Users with mobile devices may be provided with a mobile smartphone app or similar software. The network-centric application is accessible by desktop PC, laptop, tablet computer, smartphone, or other similar computing device.

3.1.2. Multiplexing

The exemplary system is configured to support a plurality of students accessing a plurality of experiments. If more than one student tries to access an experiment at a time, the system will maintain a queue of users. Students in the queue may be enabled to observe other students working on the experiment while waiting.

Different access features may be granted, based on a user's role. Role-based access control, which is known in the art, may be used. For example, a superuser or administrator group may have unbounded access for administering the system.

Instructors may be able to add, set up, configure, and remove experiments and perform other privileged functions. This enables an instructor to remotely manage a plurality of experiments in a simplified manner, such as from a web browser. The instructor can easily configure the maximum number of students in a group, the maximum and minimum experiment duration, requirements for completing the lab, such as reaching a result and each student having a minimum level of participation, and upload support materials such as quizzes and tutorials. The instructor may also be able to provide feedback through the survey feature. Instructors may also manage experiments when they have no physical access to the experiment. For example, if experiments are provided in a SaaS configuration, experimental hardware may be located hundreds of miles away.

Students may be limited to accessing experiments and logging results. In some cases, a plurality of experiments may be available to students, and a student may be able to switch between different experiments, for example, to compare results.

In some embodiments, users may be able to place advance reservations for accessing an experiment, which will give them priority queuing.

3.1.3. Group Features

Group support is provided so that students can work as teams. Students may also be given the opportunity to work in teams. In a team setting, all users will be able to observe the experiment, but only one student at a time will be able to control the experiment. Teams may be configured so that each student is limited in time controlling the experiment. For example, control of the experiment may pass every ten minutes. This enables each student in the team to have a chance to control the experiment. Users may also be able to pass control to other members of the team manually. In some cases, a criterion for successfully completing the experiment may include requiring each member of the team to control the experiment for a designated time, or to control a certain number of steps in the experiment. The group feature may also provide messaging between members of the group.

3.1.4. Chat

A real-time chat feature may be provided using known protocols. In some cases, chat is provided as a keyboard and/or mouse interface.

Users may also be able to communicate via audio and/or video interfaces. For example, users with web cams and microphones can communicate via a compressed or uncompressed audio and video stream. To accommodate students with disabilities, a speech-to-text and/or text-to-speech engine may be provided, along with other accessibility features known in the art.

3.1.5. Discussion Board

A discussion board may be provided for non-real-time interaction. For example, students can post general questions, which can be viewed by a general or selected population of users. Users can post responses when convenient.

3.1.6. Virtual Classroom

The exemplary embodiment may provide "virtual classroom" features, such as online instructor-led discussions, instructor-led experimentation, and training materials such as video, audio, text, and tutorials. The gateway server may be configured to enable an instructor logged on to the system to add, edit, or delete materials, or to link to external materials such as materials hosted on remote websites, including unaffiliated websites.

3.1.7. Survey Features

A survey feature may be provided, for example by a survey API like "Survey Monkey." Surveys may be used both for assessment and evaluation.

Assessment is used to determine what students have learned from the experiment. Assessment may be used to increase academic excellence. More advanced features may also be provided. For example, a plurality of experiments may be available, and students may be granted access to experiments based on the result of assessment surveys or quizzes. If a student demonstrates sufficient mastery of the concepts of one experiment, he or she may be granted access to more advanced experiments, which may be of more interest. In some cases, advanced experiments may be completed for extra credit.

Evaluation may be used to receive subjective feedback on the experience. Evaluations may be used to iteratively improve the system as a whole, or particular experiments.

3.1.8. System-as-a-Service Configuration

The exemplary experimentation gateway can be configured for use in a SaaS model. In that case, gateway server 450 may include additional software for tracking usage time and enabling financial transactions. Software packages for tracking usage and performing financial transactions are known in the art.

3.1.9. Graphical User Interface

The exemplary architecture provides two classes of users; namely students and instructors. Both classes of users interact with the remote laboratory architecture 100 via regular web browsers. The two classes of users are provided distinct GUIs to provide both the necessary functions. In the exemplary embodiment, both interfaces are coded in PHP with a MySQL database.

The GUI of the exemplary embodiment is further described in FIGS. 5-7.

3.1.10. Transmission Quality Control

In some cases, users may encounter usability problems on slow network connections. The quality of the transmission from the remote desktop server 360 can be controlled to provide the best experience for each setup. For example, resolution control, frame rate control, and compression can be used to reduce bandwidth requirements. In low-bandwidth applications, users may be provided with a manual screen refresh function.

3.1.11. Course Management

Certain course management software is known in the art. For example, "Blackboard" is a popular commercial solution. Certain embodiments are described in U.S. Pat. Nos. 7,493,396 and 7,558,853. Gateway server 150 may include course management software, or may include an interface for interacting or integrating with course management software.

3.1.12. System Monitoring

Gateway server 450 may provide system monitoring and report useful information such as usage statistics. This feature can also be used to determine which students have completed which experiments.

3.1.13. Privacy Features

Features can be implemented to ensure user privacy. For example, users can choose which personal information to share in a publicly-available "profile," while other private data can be hidden. Usage logs and privacy auditing features may also be provided.

3.1.14. Virtualization

As described in this specification, certain features may be provided in virtual machines. The use of virtual machines can simplify administration and improve reliability, maintenance, and security and can speed recovery from errors.

3.1.15. Research Experimentation

Although the exemplary embodiment is described with reference to a classroom experiment, similar or identical technology may be used to enable teams of remote researchers to work on experiments together.

3.1.16. Security

Gateway server 150 may be provided with state-of-the-art hardware and software security mechanisms. Gateway server 150 may provide security in addition to the security provided by encryption layer 140.

3.2. Technical Description

The exemplary embodiment is a hybrid of the server-centric architecture of FIG. 9 and server-as-gateway architecture of FIG. 10, deriving advantages from both architectures. In this embodiment, experimentation gateway 150 and experiment controller 210 are provided as physical computing devices. MySQL database 422 and streaming video server 460 are both provided as separate virtual machines running on experimentation gateway 150. Remote desktop server 360 and video broadcast interface 350 are both provided as separate virtual machines running on experiment controller 210. Providing these functions as virtual machines simplifies setup, maintenance, and security for the entire remote laboratory architecture 100. For example, a number of remotely-operable experiments 110 may provide identical client-side control applications, which need to be run on experiment controller 210. Deploying control applications can easily be accomplished by cloning and distributing virtual machine images. Snapshots of virtual machines can also be used as fast system backups. And providing a plurality of virtual machines can enable a single physical experiment controller 210 to host a plurality of remotely-operable experiments 110. In that case, each experiment 110 can be controlled by its own virtual machine running on experiment controller 210. This "sandboxes" each experiment, which protects experiment controller 210 from student tampering.

In this embodiment, experimentation gateway 150 runs Ubuntu Linux and provides services such as an Apache server for providing HTTP web interfaces, a MySQL database for storage, and a Red 5 streaming video server. Experimentation server 150 is configured to act as a gateway between network 190 and experiment controllers 210.

Actual access to remotely-operable experiments 110 is provided by using NAT module 430 to redirect traffic to the appropriate experiment controller 210. This improves security on internal network 192, which can be private. Experimentation gateway 150 may also provide other features known in the art, such as connection tunneling or virtual private networks.

Each experiment controller 210 is a small server, which contains at least two virtual machines. The first virtual machine provides the Red5 streaming video server 460 to provide video broadcasting. Streaming video server 460 is communicatively coupled to camera 220, which is a web cam. Together, these provide real-time video transmission of experimental hardware 230. The second virtual machine contains remote desktop server 360, which includes a "bare bones" Windows XP operating system and a National Instruments LabVIEW runtime. The restricted Windows XP OS contains only the specific software needed to control experimental hardware 230.

A remote laboratory architecture has been described herein with reference to one or more exemplary embodiments. Those having skill in the art will recognize that other embodiments are available, and this specification is intended to encompass such other embodiments as are within the scope of the appended claims.

What is claimed is:

1. An experimentation gateway for providing remote access to an experiment, the experimentation gateway comprising one or more processors executing instructions in memory on one or more computers to provide:
   a network interface configured to communicatively couple the gateway to a network including an experiment controller providing a remote desktop having features for controlling an experiment, wherein the experiment controller is not visible on an external network; and
   a gateway server providing a network-centric application having a graphical user interface (GUI), the network centric application configured to:
      provide an interactive graphical element for controlling the remote desktop;
      provide multiplexing features enabling a plurality of users to access the experiment, the multiplexing features including queuing, wherein users are queued in a first-in-first-out precedence, and wherein the user at the head of the queue is granted control of the remote desktop; and
      provide scheduling features enabling a plurality of users to access a second experiment, the scheduling features including maintaining at least a second queue of users attempting to access the second experiment, and granting experimental control to a user having priority in the second queue;
   wherein the experimentation gateway couples with the experiment controller in a local network using a dynamic internal IP address assigned to the controller by a DHCP-like server and, in at least certain modes of operation, the experimentation gateway couples with the experiment controller in an external network using tunneling.

2. The experimentation gateway of claim 1 wherein users in the queue are enabled to view actions taken by the user controlling the remote desktop.

3. The experimentation gateway of claim 1 wherein the gateway server is further configured to provide group features including:
   enabling a group of users to access a single remote desktop at one time;
   constructing a queue of users in the group;
   limiting control of the remote desktop to one user at a time, control passing first to the first user in the queue; and
   limiting the time a user may exercise control over the experiment controller, and after expiration of a user's time, passing control of the experiment controller to the next user in the queue.

4. The experimentation gateway of claim 1 further comprising a Network Address Translation (NAT) controller configured to segregate network traffic into internal network traffic and external network traffic.

5. The experimentation gateway of claim 1 wherein the gateway server is provided by a web server.

6. The experimentation gateway of claim 5 the web server is provided by open-source software.

7. The experimentation gateway of claim 1 wherein the gateway server further includes a real-time video server configured to receive a real-time video feed from the experiment controller and to provide an interactive graphical element for interactively viewing real-time video.

8. The experimentation gateway of claim 7 wherein the interactive graphical element further includes controls for panning the real-time video display.

9. The experimentation gateway of claim 8 wherein the interactive graphical element further includes controls for angling and zooming the real-time video display.

10. The experimentation gateway of claim 7 wherein the streaming video server is configured to provide compressed video.

11. The experimentation gateway of claim 1 wherein the GUI is further configured to provide a quality of service control for controlling quality of display from the remote desktop.

12. The experimentation gateway of claim 11 wherein the quality of service control includes a resolution control.

13. The experimentation gateway of claim 11 wherein the quality for service control includes a refresh rate control.

14. The experimentation gateway of claim 11 further comprising a manual screen update control.

15. The experimentation gateway of claim 1 wherein the experimentation gateway is configured to communicatively couple to a network having a plurality of experiment controllers.

16. The remote laboratory system of claim 1 wherein the gateway server is configured to record statistical data, including usage statistics.

17. The remote laboratory system of claim 1 wherein the gateway server is configured to provide an instructor with a histogram of usage statistics.

18. A remote laboratory system comprising one or more processors executing instructions in memory on one or more computers to provide:
   experimental hardware configured to be communicatively coupled to and controlled by an experiment controller;
   a secure network;
   an experiment controller communicatively coupled to and configured to control the experimental hardware, the experiment controller comprising:
   an experiment interface providing the communicative coupling to the experiment controller;
   a network interface configured to communicatively couple the experiment controller to the secure network;
   a virtual network connection (VNC) server configured to provide a remote desktop to a user logging on to the experiment controller, the remote desktop including a graphical virtual instrument for controlling the experimental hardware;
   an experimentation gateway communicatively coupled to the experiment controller via the secure network and configured to communicate with a plurality of student nodes and instructor nodes via an external network, the experimentation gateway comprising a web server configured to provide a network-centric graphical user interface (GUI) to students and instructors, the experimentation gateway further providing scheduling features enabling a plurality of students to access a plurality of experiments, the scheduling features including: maintaining a queue of users attempting to access one of the experiments, and granting experimental control to a user having priority in the queue;
   wherein the experimentation gateway couples with the experiment controller in a local network using a dynamic internal IP address assigned to the controller by a DHCP-like server and, in at least certain modes of operation, the experimentation gateway couples with the experiment controller in an external network using tunneling.

19. The remote laboratory system of claim 18 wherein the VNC server is provided as a virtual machine running in software on the experiment controller.

20. The remote laboratory system of claim 18 further comprising a camera operably connected to the experiment controller, the camera configured to be remotely controllable by the experiment controller and to provide a video display of the experimental hardware.

21. The remote laboratory system of claim 20 wherein the camera is operably configured to provide pan, zoom, and angle controls.

22. The remote laboratory system of claim 20 wherein the experiment controller further comprises a video broadcasting interface configured to provide real-time streaming video to the experimentation gateway.

23. The remote laboratory system of claim 22 wherein the real-time streaming video broadcasting interface is provided as a virtual machine running in software on the experiment controller.

24. The remote laboratory system of claim 18 wherein the experiment interface is a bus selected from the group consisting of USB, VMEbus, RS-232, RS-485, and GPIB.

25. A remote laboratory system comprising one or more processors executing instructions in memory on one or more computers to provide:
   an experimentation gateway communicatively coupled to an external network via an encryption layer, the external network configured to communicatively couple to a plurality of client nodes, including student nodes and instructor nodes;
   a plurality of experiments, each experiment comprising:
   experimental hardware configured to be electronically controlled;
   a camera placed to provide a video image of the experimental hardware, and provided with electronically operable controls provided pan, angle, and zoom controls;
   a plurality of experiment controllers, each experiment controller controlling one experiment, the experiment controllers being of at least three species including a standalone experiment controller, a co-located experiment controller, and a virtual experiment controller, wherein:
   the standalone experiment controller includes an encryption layer and is configured to connect to the experimentation gateway via a public network;
   a co-located experiment controller is configured to connect to the experimentation gateway via a private network; and
   the virtual experiment controller is a virtual machine hosted on the experimentation gateway and configured to connect to the experimentation gateway via a virtual network;
   and wherein the experiment controllers are configured to:
   receive a dynamic IP address from the experimentation gateway;
   provide a remote desktop application, the remote desktop application provided by a virtual machine hosted on the experiment controller, and configured to communicatively couple to and control the experiment; and provide a real-time video server, the real-time video server provided by a virtual machine hosted on the experiment controller, is communicatively coupled to the camera, and is configured to receive a real-time video feed from the camera and to provide control signals to the electronically-operable controls; and wherein the experimentation gateway is configured to provide a gateway server application, the gateway server application is configured to:

provide network-centric access via a web-based graphical user interface or via a network-enabled application configured to communicate with the gateway server application;

provide a login screen with a list of accessible experiments and the status of each accessible experiment;

provide an interactive graphical element including a display of the remote desktop application;

provide a real-time video server and an interactive graphical element including a display of the real-time video and including graphical controls for controlling the camera;

provide multiplexing features enabling a plurality of students to access a plurality of the accessible experiments, the multiplexing features including:

maintaining a first-in-first-out queue of users attempting to access an experiment, and grant experimental control to a user at the head of the queue;

enabling students in the queue to observe the student having experimental control;

provide role-based access control wherein instructors are enabled to add, setup, configure, and remove experiments, configure the maximum number of students permitted to access an experiment, configure minimum requirements for successful completion of an experiment, upload support materials, and add survey questions; and students are enabled to access and control experiments, record experimental results, access support materials, and answer surveys;

provide group features to enable students to work as teams, group features including managing control of the experiment among group members and provide messaging between members of the group;

provide real-time chat features, including a text-based chat interface;

provide a discussion board for non-real-time communication between users;

provide virtual classroom features including instructor-led discussions and instructor-led experimentation;

provide a survey feature including:

assessment surveys configured to test a student's mastery of an experiment;

evaluation surveys configured to receive a user's subjective feedback regarding the system;

provide transmission quality controls, including resolution control, frame rate control, and compression control;

provide integration with course management software;

provide system monitoring, including usage statistics;

provide privacy features for segregating a user's private data from other users;

provide functionality for non-educational research experimentation by teams of geographically-remote researchers; and provide system-as-a-service features, including software for tracking usage time, usage load, and for financial transactions wherein the experimentation gateway couples with the experiment controller in a local network using a dynamic internal IP address assigned to the controller by a DHCP-like server and, in at least certain modes of operation, the experimentation gateway couples with the experiment controller in an external network using tunneling.

26. The system of claim 25 wherein the chat feature further includes a text-to-speech engine.

27. The system of claim 25 wherein the chat feature further includes a speech-to-text engine.

* * * * *